United States Patent Office 3,210,313
Patented Oct. 5, 1965

3,210,313
ESTERS OF ε-DICARBOXIMIDO-CAPROIC ACIDS AND POLYVINYL RESINS PLASTICIZED THEREWITH
Bernard Taub, Williamsville, N.Y., assignor to Allied Chemical Corporation, New York, N.Y., a corporation of New York
No Drawing. Original application Aug. 25, 1959, Ser. No. 835,853. Divided and this application June 27, 1962, Ser. No. 205,570
8 Claims. (Cl. 260—30.2)

This application is a division of copending application Serial No. 835,853, filed August 25, 1959, now abandoned.

This invention relates to esters of ε-imidocaproic acid and to compositions containing them. It relates more particularly to esters of ε-dicarboximido-caproic acids and to compositions containing one or more polyvinyl resins and one or more of said esters as plasticizing agents for such resins.

The well known polyvinyl resins are a family of vinyl polymers and copolymers which constitute an important class of plastic materials, due largely to their versatility, breadth of application and reasonable cost. They comprise polyvinyl chloride, polyvinyl acetate, polyvinyl acetals, polyvinyl alcohol, polyvinylidene chloride, polyvinyl ethers, polyvinyl pyrollidone, polyvinyl carbazole and various copolymers thereof. (As employed herein, including the claims, the term "polyvinyl resins" denotes said vinyl polymers and copolymers.)

It is common practice in this art to introduce various ingredients such as pigments, fillers, modifying resins, foaming agents, polymerization catalysts, solvents, mold lubricants, ultraviolet absorbers and the like, into the resin formulations. The formulation, curing and further treatment of such compositions are well known to those skilled in the polymer art and no extended discussion of them is believed necessary.

Commercial exploitation of these resins was made possible by the discovery and use of plasticizers, which are generally liquid or low melting solid compounds and which when incorporated into the resin formulation enable the rigid resin material to become flexible and accordingly useful in numerous applications.

With the growth of the field of application of resinous compositions based on polyvinyl resins, the demand for effective plasticizers which could impart specialized characteristics to the finished product has led to an intensive search for compounds which lead to some, and desirably all, of the following results:

(1) The finished product containing the plasticizer should be flexible.
(2) The plasticizer should be compatible with the resin, and produce clear compositions.
(3) The plasticizer should act to lower the viscosity of the resin formulation so that at the processing temperature an easily workable mass is obtained.
(4) The physical properties of the finished product should be improved, i.e., the tensile strength, resistance to heat distortion, dielectric character and the like, should be increased.
(5) The plasticizer should be stable and not bleed out from the finished resin product.
(6) The plasticizer should not affect adversely the rate of cure or aging of the polymerizable composition.

Prior to the present invention, the compounds which have found the greatest application as plasticizers for polyvinyl resins have been diesters of dicarboxylic acids, such as dibutyl phthalate, dioctyl phthalate and dioctyl succinate. Although these diesters result in acceptable working viscosities and flexible polymerized products, they have the objectionable tendency to bleed, that is gradually to evaporate from the finished product, with the result that the originally clear and flexible product becomes hazy and brittle after a relatively short period of use. Further, the amount of plasticizer required to impart the desirable degree of fluidity and flexibility is so great that other physical properties, such as tensile strength and the like, are often reduced to an undesirable extent.

I have discovered that the monohydric alcohol esters of ε-dicarboximido-caproic acids constitute a novel class of compounds having advantageous properties which render them highly effective as plasticizers for polyvinyl resins. Thus, I have discovered that said esters are compatible with the polyvinyl resins, producing clear compositions which are flexible and stable and which are easily worked at the process temperature, without requiring the use of such excessive amounts of them that other properties of the compositions are harmfully affected.

In general, an amount of ester equal to about 20% to about 60% of the weight of the polyvinyl resin is used. In view of the general compatibility of the esters of the present invention with polyvinyl resins, especially at the temperature at which the resin formulations are compounded, the esters can be readily blended with said resins. The relatively high boiling points of the esters also are an advantage in their use as plasticizers, since during the compounding of the resin mix the ingredients are subjected to considerable heat in order to obtain plasticization and dispersion of pigments and other ingredients; for example, they may be passed between a series of heated rolls operating at differential speeds, such as a Banbury mixer. Further, due to the low vapor pressure of the esters, little if any loss is encountered, and the usual fume problem, with resultant health and safety hazards to personnel and equipment, is avoided.

The esters of the present invention include various monohydric alcohol esters of ε-dicarboximido-caproic acids in which the dicarboximido radicals are derived from various organic dicarboxylic acids, and more particularly from organic dicarboxylic acids in which the two carbonyl groups are linked to carbon atoms of a carbon chain which is part of an aliphatic, alicyclic or aromatic radical. Typical monohydric alcohol esters of ε-dicarboximido-caproic acids of the present invention are represented by the following general formula:

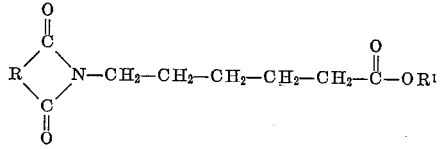

in which
R represents a radical having at least 2 carbon atoms to which the carbonyl groups are linked, and
R¹ represents the residue of a monohydric alcohol.

Not all of the various esters of said class impart to the same extent the advantageous properties to polyvinyl resin compositions containing them. Thus, while the lower alkyl esters, such as the methyl and ethyl esters of the dicarboximido-caproic acids, are highly effective as plasticizers for polyvinyl resins, their advantageous effect upon the tensile strength and stability of the resins containing them is not as great as that of esters derived from alkanols of intermediate chain length, such as openchain alcohols having 6 to 12 carbon atoms, inclusive, and especially the esters derived from hexyl and 2-ethylhexyl alcohols. Further, the esters derived from alkanols having 6 to 12 carbon atoms are generally more readily incorporated in the resin formulations and produce resinous compositions having better viscosity characteristics than the esters derived from such higher alcohols as oleyl and palmityl alcohols. Accordingly, those esters of the present invention which are derived from alkanols having 6 to 12 carbon atoms are preferred for use as plasticizers for polyvinyl resins in accordance with the present invention. (It is noted that all ranges in this description and the appended claims include the limits.)

The esters of the present invention can be prepared in a number of ways. They are readily prepared by esterifying the corresponding ε-dicarboximido-caproic acid with a monohydric alcohol or a mixture of monohydric alcohols; for example, by heating the dicarboximido-caproic acid with a small excess (on an equimolecular basis) of a monohydric alcohol in the presence of an esterification catalyst. Preferably the reaction is carried out in the presence of a water-immiscible solvent, such as toluene, and the reaction mixture is distilled to remove water formed by the esterification reaction. The esters so formed can be isolated in the pure form by distillation under reduced pressure.

Various ε-dicarboximido-caproic acids can be employed for the production of the esters. Many of them are themselves new compounds which have not been prepared or described heretofore. I have found that they can be readily prepared by heating together at elevated temperatures (e.g., above 175° C.) equimolecular proportions of ε-caprolactam and the anhydride of an organic dicarboxylic acid for about 16 to about 24 hours, and isolating the product in any suitable manner, as by distilling off unreacted material and then fractionally distilling the residue at subatmospheric pressure.

The following are illustrative of organic dicarboxylic acid anhydrides which may be thus employed for the manufacture of ε-dicarboximido-caproic acids:

Maleic acid anhydride
Succinic acid anhydride
Dimethylsuccinic acid anhydride
Dibromosuccinic acid anhydride
Dodecenylsuccinic acid anhydride
Phthalic acid anhydride
Tetrachlorophthalic acid anhydride
Tetrabromophthalic acid anhydride
Δ⁴-tetrahydrophthalic acid anhydride
Hexahydrophthalic acid anhydride If desired, mixtures of two or more of the anhydrides may be employed to produce mixtures of the ε-dicarboximido-caproic acids.

As illustrative embodiments of the preparation of the ε-dicarboximido-caproic acids, the following examples are given. The parts are by weight and the temperatures are in degrees centigrade.

EXAMPLE A

A mixture of 62.5 parts (0.55 mol) of ε-caprolactam and 76.0 parts (0.5 mol) of Δ⁴-tetrahydrophthalic acid anhydride was heated to and maintained at 185° for 18 hours. The mixture was agitated during the heating period. Thereafter unreacted caprolactam and anhydride were distilled from the mass, and the remainder was fractionally distilled at subatmospheric pressure. The product, ε-tetrahydrophthalimido-caproic acid boiling at 221° to 224° under 1 mm. mercury pressure was collected separately. This fraction weighed 114 parts (86% of theory yield) and was a viscous, colorless oil which solidified on standing to yield a solid acid melting at 80°. It had the formula:

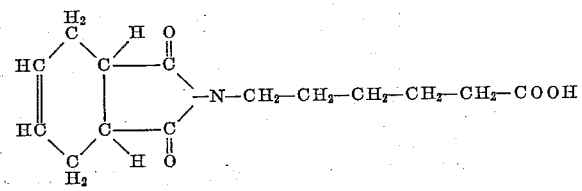

Analysis.—Calculated for $C_{14}H_{19}O_4$: 5.3% N. Found: 5.1% N. Neutral equivalent calc.: 265. Found: 265.

EXAMPLES B THROUGH E

The following dicarboximido-caproic acids were similarly prepared by the process of above Example A using equivalent molar amounts of phthalic, hexahydrophthalic, succinic and dodecenylsuccinic acid anhydrides, respectively, in place of the tetrahydrophthalic acid anhydride.

The products had the physical constants indicated in Table I below.

*Table I*

| Product | Boiling Range | M.P. | Neutral Equivalent Calc. | Neutral Equivalent Found |
|---|---|---|---|---|
| Phthalimidocaproic acid | 239°–240°/3 mm | 107–8° | 260 | 265 |
| Hexahydrophthalimido-caproic acid | 235°–239°/3 mm | | 267 | 271 |
| Succinimido-caproic acid | 216°–220°/2 mm | 82–84° | 213 | 215 |
| Dodecenylsuccinimido-caproic acid | 247°–255°/2 mm | | 379 | 384 |

Various monohydric alcohols can be reacted with the ε-dicarboximido-caproic acids to produce the esters of the present invention. They include open-chain and cyclic monohydric alcohols; such as, the alkanols of various carbon chain lengths, alicyclic monohydric alcohols having the hydroxyl group in the cyclic nucleus or a side chain, and araliphatic monohydric alcohols.

The following are illustrative of such alcohols:

Methanol
Ethanol
t-Butanol
Hexanols
Octyl alcohols
Decyl alcohols
Lauryl alcohol
Oleyl alcohol
Palmityl alcohol
Mixtures of alcohols obtained by the sodium reduction of long-chain fatty acid esters
Cyclohexanol
Benzyl alcohol Mixtures of two or more of the alcohols also can be employed to produce mixtures of esters of the same ε-dicarboximido-caproic acid or of a mixture of ε-dicarboximido-caproic acids.

The invention will be illustrated by the following specific examples, but it is to be understood that it is not limited to the details thereof and that changes may be made without departing from the scope of the invention. The temperatures are in degrees centigrade and the parts and percentages are by weight.

EXAMPLE 1

A mixture consisting of 53 parts (0.2 mol) of Δ⁴-tetrahydrophthalimido-caproic acid, prepared as described in Example A above, 32 parts (0.24 mol) of 2-ethylhexyl alcohol, 75 parts of toluene and 0.5 part of 100% sulfuric acid were heated to boiling under a reflux condenser equipped with a Dean-Stark water separator. The mixture was boiled until the water which had separated corresponded to the theoretical amount formed by the esterification reaction (about 18 hours). The toluene was removed by distillation from the mass, and the remainder was fractionally distilled. The fraction boiling at 234° to 237° at 2.5 mm. was collected separately. It consisted of 54 parts (72% of the theoretical yield) of 2-ethylhexyl-ε-tetrahydrophthalimido-caproate, having the formula:

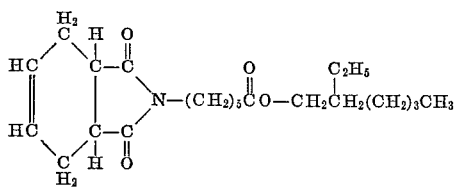

EXAMPLES 2 TO 8

The following esters, having the boiling ranges at the pressures set out in Table II below, were prepared in a similar manner to that set out in Example 1, employing corresponding amounts of other ε-dicarboximido-caproic acids and alcohols referred to above.

Table II

| Ester | Boiling Range | Percent Yield |
|---|---|---|
| 2-ethylhexyl-ε-hexahydrophthalimido-caproate. | 220°–235°/1.5 mm. | 72 |
| 2-ethylhexyl-ε-succinimido-caproate | 210°/2 mm | 93 |
| 2-ethylhexyl-ε-phthalimido-caproate | 243°–246°/3 mm | 88 |
| n-Butyl-ε-phthalimido-caproate | 214°–216°/2 mm | 88 |
| 2-ethylhexyl-ε-dodecenylsuccinimido-caproate. | 215°/2 mm | 55 |
| Ethyl-ε-tetrahydrophthalimido-caproate | 197°–200°/2 mm | 80 |
| Ethyl-ε-hexahydrophthalimido-caproate | 197°–200°/2 mm | 70 |

EXAMPLE 9

The beneficial effects of the dicarboximido-caproates prepared in Examples 1 to 8 above, when admixed in plasticizing amount with polyvinyl resins, were demonstrated in the following manner.

The esters were compounded with a commercially available polyvinyl chloride resin (Geon 101) in the proportion of 33.3 parts of the caproate and 66.7 parts of the resin. The mixture was blended, on a two roller mill heated to about 140°, for about 15 minutes. A 4″ x 4″ square of the resulting mass was calendered in a heated Carver press and the resulting film subjected to a number of conventional tests to determine its physical properties. The tests are among those generally accepted as providing a measure of the plasticizing ability of a plasticizer. For purposes of comparison, similar tests were made with several commercially obtainable known plasticizers. The results of these tests are given in the following Table III.

Table III

| Plasticizer | Tensile Strength,[1] p.s.i. | Elongation at break,[1] percent | Shore 5 Sec. Hardness Test[2] Durometer Reading | Wt. Loss 2 Hrs. at 70°, Percent | Physical Appearance |
|---|---|---|---|---|---|
| 2-ethylhexyl-ε-Δ⁴-tetrahydrophthalimido-caproate. | 2,360 | 766 | 84 | 0.4 | Clear. |
| Di(2-ethylhexyl)-Δ⁴-tetrahydrophthalate | 1,496 | 316 | 87 | 0.8 | Opaque. |
| 2-ethylhexyl-ε-hexahydrophthalimido-caproate. | 2,560 | 660 | 85 | 0.4 | Clear. |
| Di(2-ethylhexyl) hexahydrophthalate | 1,520 | 366 | 87 | 0.7 | Opaque. |
| 2-ethylhexylsuccinimido-caproate | 1,926 | 736 | 82 | 0.5 | Clear. |
| Di(2-ethylhexyl)succinate | 1,343 | 416 | 86 | 3.1 | Opaque. |
| 2-ethylhexylphthalimido-caproate | 2,453 | 423 | 91 |  | Clear. |
| Di(2-ethylhexyl)phthalate ("DOP") | 1,525 | 240 | 90 |  | Opaque. |
| n-Butyl-ε-phthalimido-caproate | 2,720 | 475 | 91 |  | Clear. |
| Di-butyl phthalate | 2,447 | 437 | 92 |  | Opaque. |
| 2-ethylhexyl-ε-dodecinylsuccenimido-caproate. | 2,040 | 400 | 93 | 0.5 | Clear. |

[1] ASTM Test D-638.
[2] ASTM Test D-676.

As indicated by these data, the novel carboximido-caproates of my invention give rise to stronger, more flexible, clearer plastic compositions from which the plasticizer bleeds less than the analogous compositions containing the analogous known ester plasticizers.

My invention has been described and illustrated with reference to several specific embodiments thereof. While these examples include the preferred procedures, it should be noted that variations of these procedures are possible. Hence it will be evident that the invention is not limited to the details of the foregoing illustrative examples and that changes can be made without departing from the scope of the invention.

Thus, the esterification reaction can be effected in the absence of the water-immiscible solvent; or, in place of the toluene used, other solvents of this character such as benzene, xylene, and the like can be used. Other catalysts than sulfuric acid can be used to accelerate the esterification, such as p-toluene sulfonic acid, halogen acids, and the like.

Further, in the reaction forming the dicarboximido-caproic acid, high boiling solvents also can be used, such as xylenes, petroleum fractions boiling above 150° C., nitrobenzene, and the like.

I claim:

1. A polyvinyl resin composition comprising essentially a polyvinyl resin selected from the group consisting of polyvinyl chloride, polyvinyl acetate, polyvinyl acetals, polyvinyl alcohol, polyvinylidene chloride, polyvinyl pyrollidone, polyvinyl carbazole and copolymers thereof and, as a plasticizer therefor, a monohydric alcohol ester of an epsilon-dicarboximido-caproic acid, the dicarboximido radical of which is derived from an organic dicarboxylic acid having 4 to 16 carbon atoms and the alcohol residue of which is a hydrocarbon radical having 1 to 18 carbon atoms.

2. A polyvinyl resin composition comprising essentially a polyvinyl resin selected from the group consisting of polyvinyl chloride, polyvinyl acetate, polyvinyl acetals, polyvinyl alcohol, polyvinylidene chloride, polyvinyl pyrollidone, polyvinyl carbazole and copolymers thereof and, as a plasticizer therefor, a monohydric alcohol ester of an epsilon-dicarboximido-caproic acid the dicarboximido radical of which is derived from an aliphatic dicarboxylic acid having 4 to 16 carbon atoms and the alcohol residue of which is an open-chain hydrocarbon radical having 1 to 18 carbon atoms.

3. A polyvinyl resin composition comprising essentially a polyvinyl resin selected from the group consisting of polyvinyl chloride, polyvinyl acetate, polyvinyl acetals, polyvinyl alcohol, polyvinylidene chloride, polyvinyl pyrollidone, polyvinyl carbazole and copolymers thereof and, as a plasticizer therefor, a monohydric alcohol ester of an epsilon-dicarboximido-caproic acid the dicarboximido radical of which is derived from a mononuclear aromatic dicarboxylic acid and the alcohol residue of which is an open-chain hydrocarbon radical having 1 to 18 carbon atoms.

4. A polyvinyl resin composition comprising essentially a polyvinyl resin selected from the group consisting of polyvinyl chloride, polyvinyl acetate, polyvinyl acetals, polyvinyl alcohol, polyvinylidene chloride, polyvinyl pyrollidone, polyvinyl carbazole and copolymers thereof and, as a plasticizer therefor, a monohydric alcohol ester of an epsilon-dicarboximido-caproic acid the dicarboximido radical of which is derived from a mononuclear alicyclic dicarboxylic acid and the alcohol residue of which is an open-chain hydrocarbon radical having 1 to 18 carbon atoms.

5. A polyvinyl resin composition comprising essentially a polyvinyl resin selected from the group consisting of polyvinyl chloride, polyvinyl acetate, polyvinyl acetals, polyvinyl alcohol, polyvinylidene chloride, polyvinyl pyrollidone, polyvinyl carbazole and copolymers thereof and, as a plasticizer therefor, a monohydric alcohol ester of an epsilon-dicarboximido-caproic acid as defined in claim 1 in which the alcohol residue is a hydrocarbon radical derived from a monohydric alcohol selected from the group consisting of aliphatic alcohols, alicyclic alcohols and araliphatic alcohols having 1 to 18 carbon atoms.

6. A polyvinyl resin composition comprising essentially a polyvinyl resin selected from the group consisting of polyvinyl chloride, polyvinyl acetate, polyvinyl acetals, polyvinyl alcohol, polyvinylidene chloride, polyvinyl pyrollidone, polyvinyl carbazole and copolymers thereof and, as a plasticizer therefor, a monohydric alcohol ester of an epsilon-dicarboximido-caproic acid as defined in claim 1 in which the alcohol residue is an open-chain hydrocarbon radical having 6 to 12 carbon atoms.

7. A polyvinyl resin composition comprising essentially a polyvinyl chloride resin and, as a plasticizer therefor, 20% to 60% of the weight of said resin of a monohydric alcohol ester of an epsilon-dicarboximido-caproic acid as defined in claim 1 in which the alcohol residue is an open-chain hydrocarbon radical having 6 to 12 carbon atoms.

8. A polyvinyl resin composition as defined in claim 7 in which the ester of epsilon-dicarboximido-caproic acid is derived from a dicarboxylic acid selected from the group consisting of maleic acid, succinic acid, dimethylsuccinic acid, dibromosuccinic acid, dodecenylsuccinic acid, phthalic acid, tetrachlorophthalic acid, tetrabromophthalic acid, $\Delta^4$-tetrahydrophthalic acid and hexahydrophthalic acid.

References Cited by the Examiner
UNITED STATES PATENTS

| | | | |
|---|---|---|---|
| 2,487,106 | 11/49 | Cornwell | 260—281 |
| 2,492,554 | 12/49 | Chodroff et al. | 260—326 |
| 2,972,619 | 2/61 | Young | 260—281 |

MORRIS LIEBMAN, *Primary Examiner.*

ALEXANDER H. BRODMERKEL, *Examiner.*